US012607316B1

(12) United States Patent
Hwang

(10) Patent No.: US 12,607,316 B1
(45) Date of Patent: Apr. 21, 2026

(54) CANDLE WICK SWING STRUCTURE OF CANDLE LAMP

(71) Applicant: METROMAX AMERICA CORPORATION, Rowland Heights, CA (US)

(72) Inventor: Christina Hwang, Rowland Heights, CA (US)

(73) Assignee: METROMAX AMERICA CORPORATION, Rowland Heights, CA (US)

( * ) Notice: Subject to any disclaimer, the term of this patent is extended or adjusted under 35 U.S.C. 154(b) by 0 days.

(21) Appl. No.: 19/225,101

(22) Filed: Jun. 2, 2025

(51) Int. Cl.
*F21S 10/04* (2006.01)
*F21S 6/00* (2006.01)

(52) U.S. Cl.
CPC ............. *F21S 10/046* (2013.01); *F21S 6/001* (2013.01)

(58) Field of Classification Search
CPC ........... F21S 10/046; F21S 10/04; F21S 6/001
See application file for complete search history.

(56) References Cited

U.S. PATENT DOCUMENTS

| | | | | |
|---|---|---|---|---|
| 8,070,319 | B2 | 12/2011 | Schnuckle et al. | |
| 9,366,402 | B2 | 6/2016 | Li | |
| 9,915,402 | B2 * | 3/2018 | Dong | F21S 10/046 |
| 11,560,992 | B1 * | 1/2023 | Lin | F21S 10/046 |
| 12,222,076 | B1 * | 2/2025 | She | F21K 9/65 |
| 12,281,763 | B1 | 4/2025 | Hwang | |
| 2008/0117633 | A1 * | 5/2008 | Li | F21S 6/001 84/602 |
| 2014/0211499 | A1 * | 7/2014 | Fong | H05B 45/00 362/558 |
| 2018/0003352 | A1 * | 1/2018 | Cao | F21V 23/02 |
| 2020/0217469 | A1 * | 7/2020 | Fan | F21S 10/046 |
| 2025/0243981 | A1 * | 7/2025 | Zhu | F21S 6/001 |

* cited by examiner

*Primary Examiner* — William N Harris
(74) *Attorney, Agent, or Firm* — BACON&THOMAS,PLLC

(57) ABSTRACT

A candle wick swing structure of a candle lamp includes a candle flame-shaped light-transmitting cover movably arranged above an LED and a conical light-transmitting member, a counterweight assembly extending downward to the bottom end of the light-transmitting cover and arranged in a way such that the center of gravity of the light-transmitting cover is lower than the LED, and the counterweight assembly is driven by a drive assembly, so that the light-transmitting cover can swing irregularly relative to the LED with the conical light-transmitting member as the fulcrum, so as to simulate the flickering effect of a candle flame.

8 Claims, 6 Drawing Sheets

CANDLE WICK SWING STRUCTURE OF CANDLE LAMP

FIELD OF THE INVENTION

The present invention relates to a candle wick swing structure of a candle lamp, and more particularly relates to a candle wick swing structure which is driven by a motor to produce irregular swings and return the structure to its normal position by lowering the center of gravity of the candle wick.

BACKGROUND OF THE INVENTION

The structure of an electronic candle lamp available on the market generally comes with a through hole formed on the top of a candle-shaped housing, the housing is movably provided with an imitated flame sheet above the through hole and is equipped with an LED, and an electronic driving device and a power supply module installed under the imitated flame sheet. The electronic driving device is used to drive the imitated flame sheet to swing irregularly above the through hole, so that the light emitted by the LED can be irradiated from the through hole to the imitated flame sheet, thereby giving the imitated flame sheet a visual sense of simulating the flickering of a candle flame.

The aforementioned candle lamp structure has been in use for many years. The inventor of the present invention has conducted research and development and improvement on candle lamps, including U.S. Pat. No. 12,281,763 B1, entitled "WATERPROOF ELECTRONIC CANDLE LAMP", which primarily improves the waterproof structure of candle lamps, so that electronic candle lamps can be used outdoors to avoid damage to electronic parts, and another U.S. patent application Ser. No. 19/033,753, entitled "CANDLE LIGHT WITH MODULAR DESIGN FOR EASY TRANSPORTATION", which improves the transportation packaging structure of candle lamps by modularizing the parts of candle lamps, allowing at least two candle lamps of different sizes to be packaged together, thus reducing the volume and cost of transportation.

In actual use of the aforementioned prior art, the inventor of the present invention has found that the imitated flame sheet is in the form of a sheet, the LED emits light on the back of the imitated flame sheet, and the imitated flame sheet uses electromagnetic induction to control its swinging amplitude in a non-contact manner, so the overall appearance is still different from the actual flame. For example, U.S. Pat. Nos. 8,070,319 and 9,366,402 also have the same problem. Therefore, the inventor of the this invention has further improved the appearance structure, lighting structure and swinging structure of the simulated flame in the candle lamps, in the hope of making the visual effect of the simulated flame perfect.

SUMMARY OF THE INVENTION

Specifically, the present invention discloses a candle wick swing structure of a candle lamp, including:

a hollow lamp holder, having a circular top end, a bottom end, and an accommodation space defined between the circular top end and the bottom end;

a positioning bracket, horizontally spanned in the accommodation space of the hollow lamp holder, the positioning bracket including an LED located under the center of the circular top end, and a conical light-transmitting member mounted on the top of the LED, and the conical light-transmitting member having a tip located at the top of the conical light-transmitting member;

a light-transmitting cover, in a simulated candle frame shape, and having a conical top end and a circular bottom end, the conical top end protruding from the top of the circular top end of the hollow lamp holder, the inner periphery of the circular bottom end being provided with an upper concave part which is concave upward and corresponding to the tip of the conical light-transmitting member, and the upper concave part being movably placed on the tip of the conical light-transmitting member, so as to allow the light emitted by the LED to pass through the conical light-transmitting member and irradiate the surrounding of the light-transmitting cover;

a counterweight assembly, including at least one extension arm extending downward from a part of the circular bottom end of the light-transmitting cover, and a counterweight arranged on the extension arm, and the counterweight being disposed under the LED, such that the center of gravity of the light-transmitting cover is situated under the LED through the extension arm and the counterweight; and a drive assembly, comprising a motor and a pendulum member driven to rotate by the motor, the pendulum member being located at a position where its rotation stroke is interfered by the counterweight, so that the candle flame-shaped light-transmitting cover can swing irregularly relative to the LED with the tip of the conical light-transmitting member as the fulcrum by the pendulum member touching the counterweight during rotation, so as to simulate the effect of the flickering of the candle flame.

Compared with the prior art, the present invention has the design of a three-dimensional light-transmitting cover located above the LED to simulate the appearance of flames, and lowers the center of gravity of the light-transmitting cover, so that after the counterweight is in contact with the pendulum member, it will naturally return to its normal position due to gravity. This is different from the related-art imitated flame sheet, which controls its swing amplitude by electromagnetic induction in a non-contact manner.

It is noteworthy that after the counterweight produces irregular swings and angle changes, different resistances can be generated to the pendulum member that is in contact with the counterweight again. Therefore, when the present invention is implemented, the motor can be designed to change the rotation direction according to the resistance, so that the swing of the counterweight and the light-transmitting cover is more random, and a natural flickering effect similar to the real flame is generated.

The technical characteristics of the present invention will become apparent with the detailed description of preferred embodiments accompanied with the illustration of related drawings.

DESCRIPTION OF THE PREFERRED EMBODIMENTS

Figure 1:
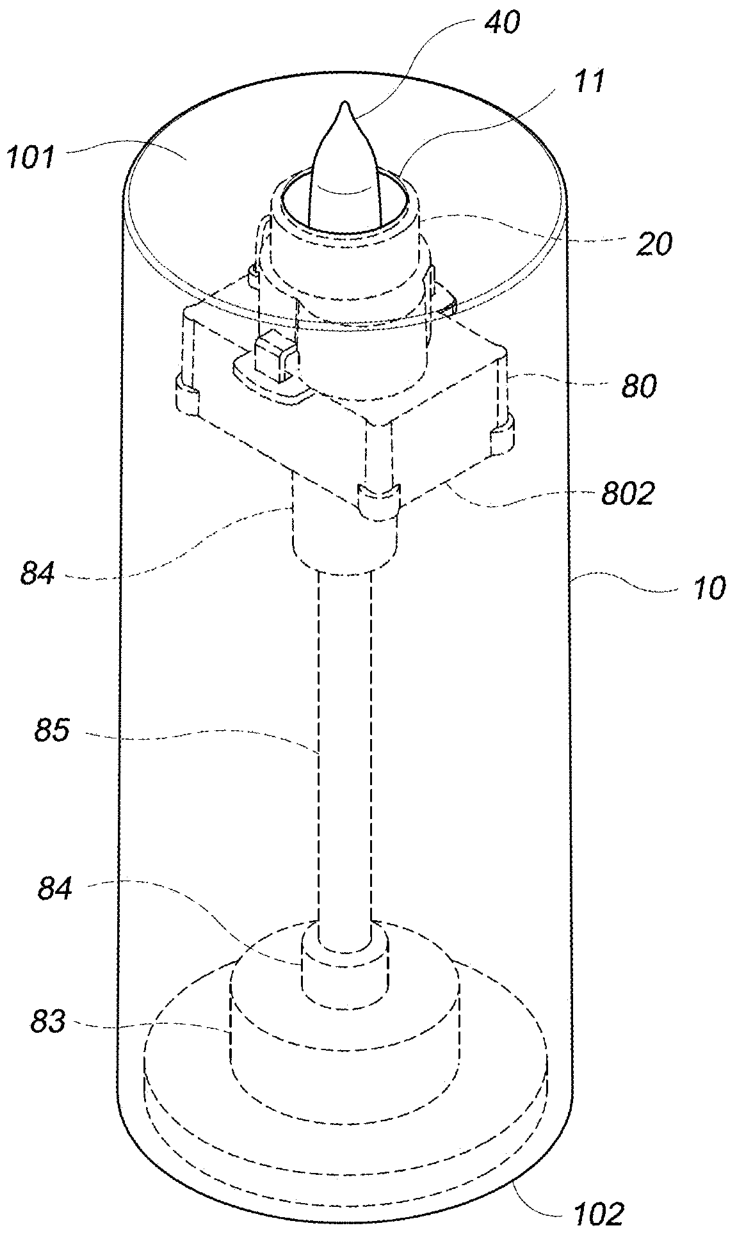
FIG. 1 is a schematic view showing the configuration of the present invention.

With reference to FIGS. 1 to 4 for a candle wick swing structure of a candle lamp in accordance with the present invention, the candle lamp includes a cylindrical lamp housing 10 for simulating the appearance of a candle, the center of the top surface 101 of the cylindrical lamp housing 10 is provided with an opening 11, and the candle wick swing structure is installed under the inner periphery of the opening 11 and includes: a hollow lamp holder 20, a positioning bracket 30, a light-transmitting cover 40 in an imitated candle flame shape, a counterweight assembly 50, and a drive assembly 60.

The hollow lamp holder 20 is installed under the inner periphery of the opening 11 of the cylindrical lamp housing 10, an accommodation space 203 is defined between the circular top end 201 and bottom end 202 of the hollow lamp holder 20, and the positioning bracket 30 is horizontally spanned in the accommodation space 203.

The positioning bracket 30 includes an LED 70 installed under the center of the circular top end 201 and a conical light-transmitting member 31 mounted onto the top of the LED 70, and the conical light-transmitting member 31 has a tip 32 located at the top 301 of the conical light-transmitting member 31.

The conical top end 401 of the light-transmitting cover 40 protrudes from the circular top end 201 of the hollow lamp holder 20 and the opening 11 of the cylindrical lamp housing 10, simulating the appearance of a candle wick; the inner periphery of the circular bottom end 402 of the light-transmitting cover 40 corresponds to the tip 32 of the conical light-transmitting member 31 and is provided with an upper concave part 41 that is concave upward, and the upper concave part 41 is movably placed on the tip 32 of the conical light-transmitting member 31, so that the light emitted by the LED 70 can pass through the conical light-transmitting member 31 and the upper concave part 41 to emit light from the periphery of the light-transmitting cover 40.

The counterweight assembly 50 includes at least one extension arm 51 partially extending downward from the circular bottom end 402 of the light-transmitting cover 40, and a counterweight 52 installed on the extension arm 51 and located under the LED 70, so that the center of gravity of the light-transmitting cover 40 is located under the LED 70 through the extension arm 51 and the counterweight 52. In the figures, there are two extension arms 51, and the two extension arms 51 can be integrally formed with the light-transmitting cover 40 and assembled with the counterweight 52.

The drive assembly 60 includes a motor 61 and a pendulum member 62, the pendulum member 62 is driven to rotate by the motor 61, and the pendulum member 62 is located at a position where its rotation stroke is interfered by the counterweight 52.

Figure 4:
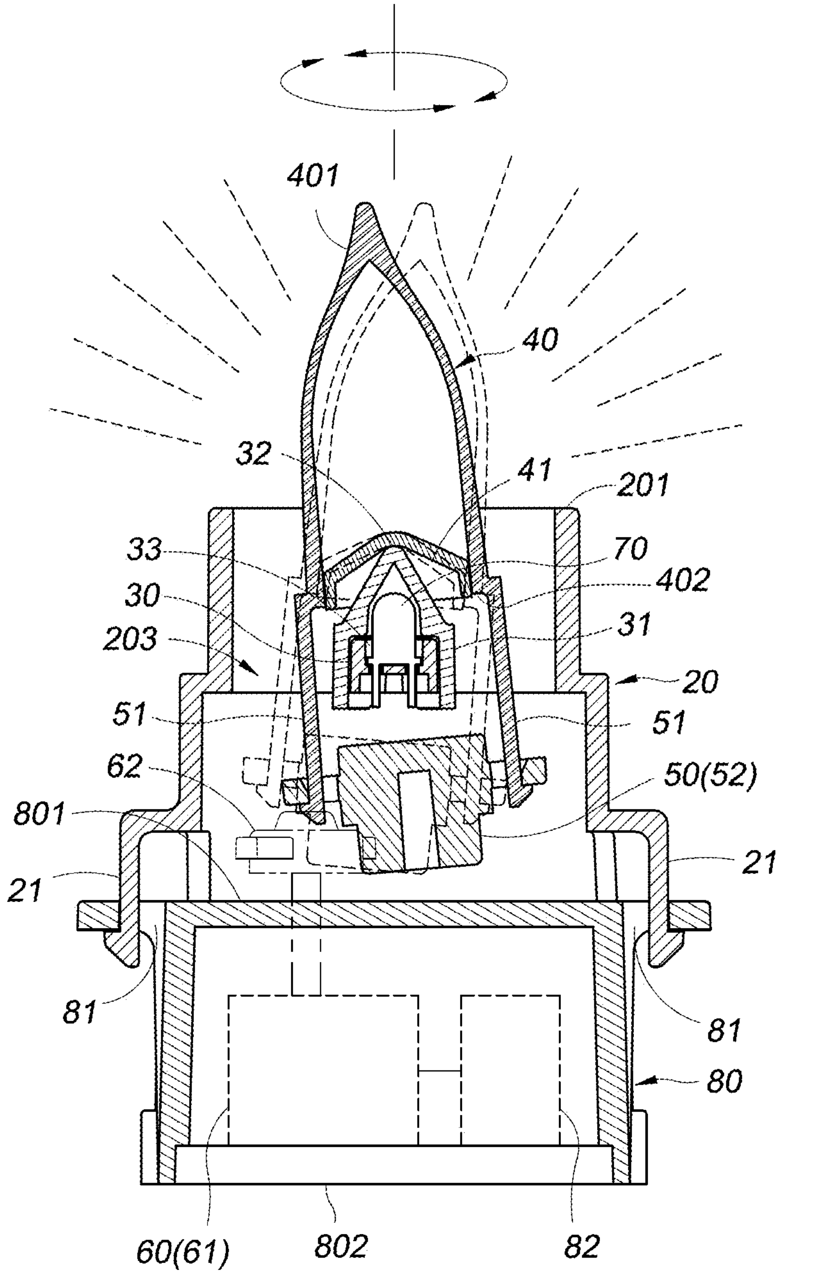
FIG. 4 is another cross-sectional side view of the present invention.
Figure 5:
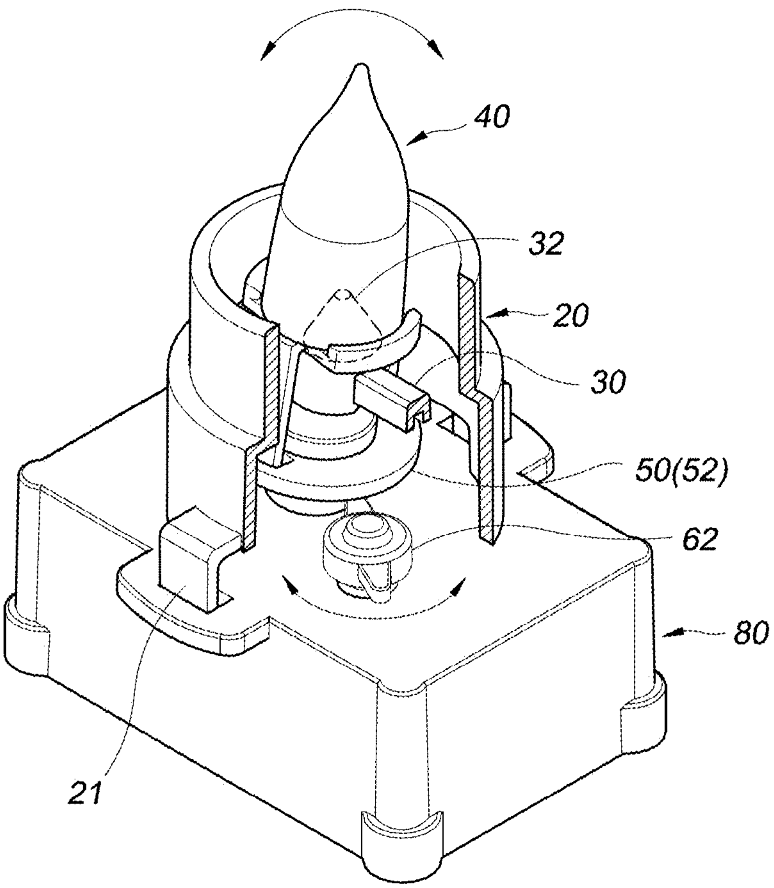
FIG. 5 is a first schematic view showing the irregular swing of a light-transmitting cover in accordance with the present invention.
Figure 6:
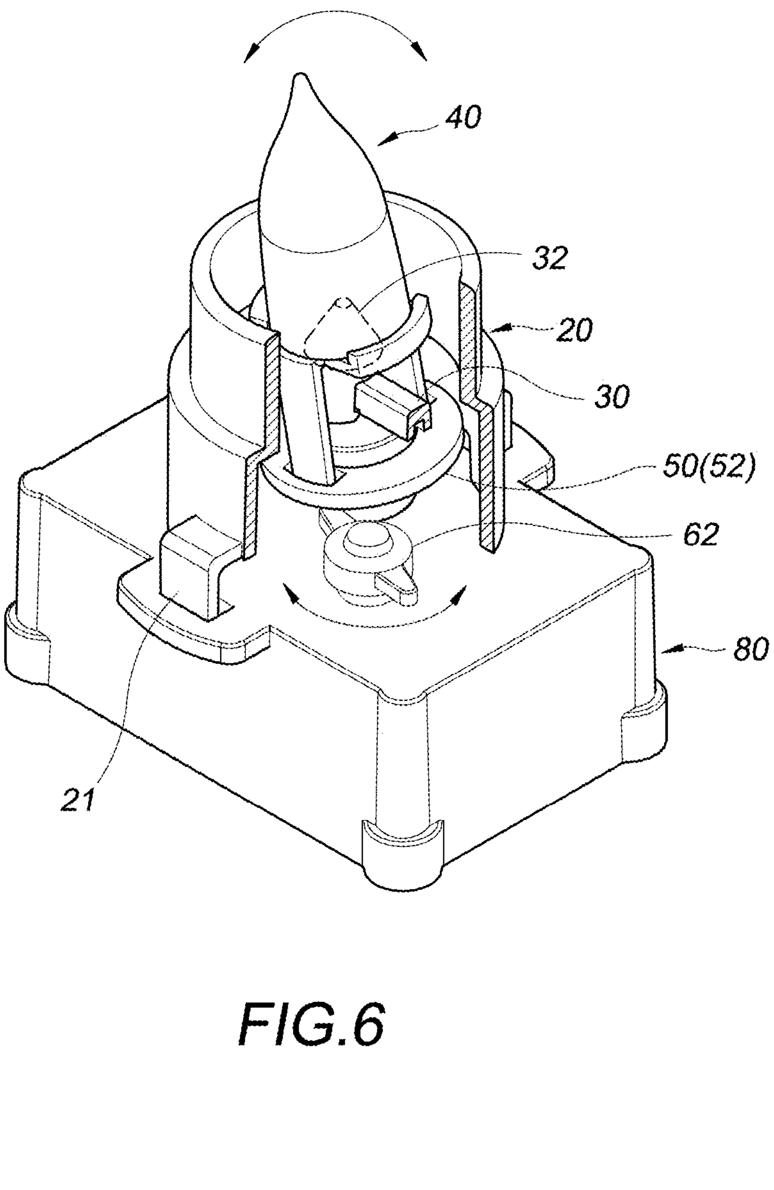
FIG. 6 is a second schematic view showing the irregular swing of a light-transmitting cover in accordance with the present invention.

As shown in FIGS. 4 to 6, when the motor 61 drives the pendulum member 62 to rotate and touch the counterweight 52, the light-transmitting cover 40 can swing relative to the LED 70 with the tip 32 of the conical light-transmitting member 31 as the fulcrum, and the light-transmitting cover 40 lowers its center of gravity due to the counterweight 52, generating an irregular swing that naturally returns to its normal position, simulating the effect of the flickering of a real candle flame.

Compared with the prior art, the present invention has two differences to improve the flame simulation visual effect of the candle lamp: Firstly, the light-transmitting cover 40 of the present invention is in a three-dimensional shape and arranged above and around the LED 70, so that the shape of the flame of the simulated candle wick is closer to the real state, which is different from the LED of the related-art candle lamp in which the light is emitted from a side of the imitated flame sheet. Secondly, the present invention lowers the center of gravity of the light-transmitting cover 40, so that after the counterweight 52 is in contact with the pendulum member 62, the counterweight 52 will produce irregular swings that naturally return the pendulum member 62 to its normal position due to gravity, which is different from the related-art imitated flame sheet that controls its swing amplitude by a non-contact method of electromagnetic induction.

Figure 3:
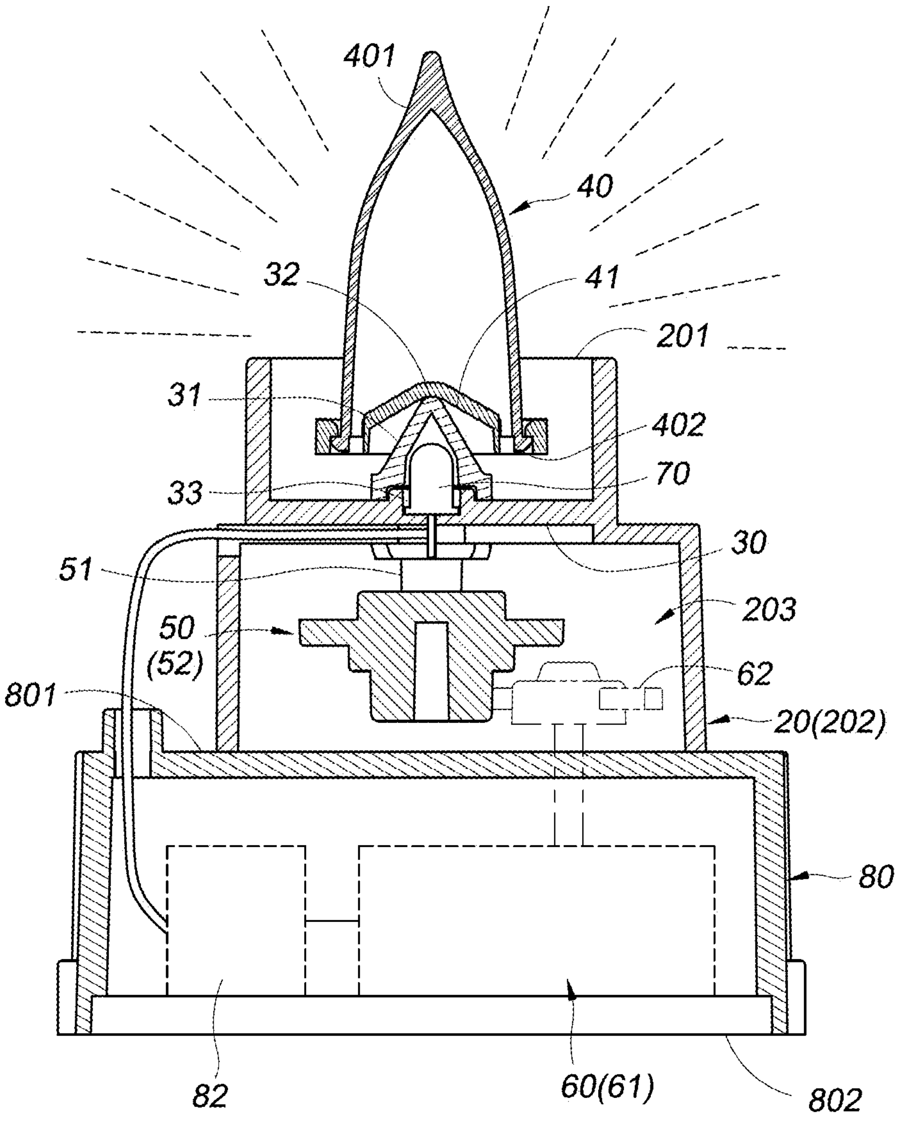
FIG. 3 is a cross-sectional side view of the present invention.

The implementation of each component of the present invention is described below:

In an embodiment as shown in FIG. 3, the positioning bracket 30 is provided with a fixing slot 33 for fixing the LED 70, and the conical light-transmitting member 31 is fixed on the positioning bracket 30 and covers the fixing slot 33 and the LED 70. In the figure, the hollow lamp holder 20 and the positioning bracket 30 are integrally formed as a whole piece.

Figure 2:
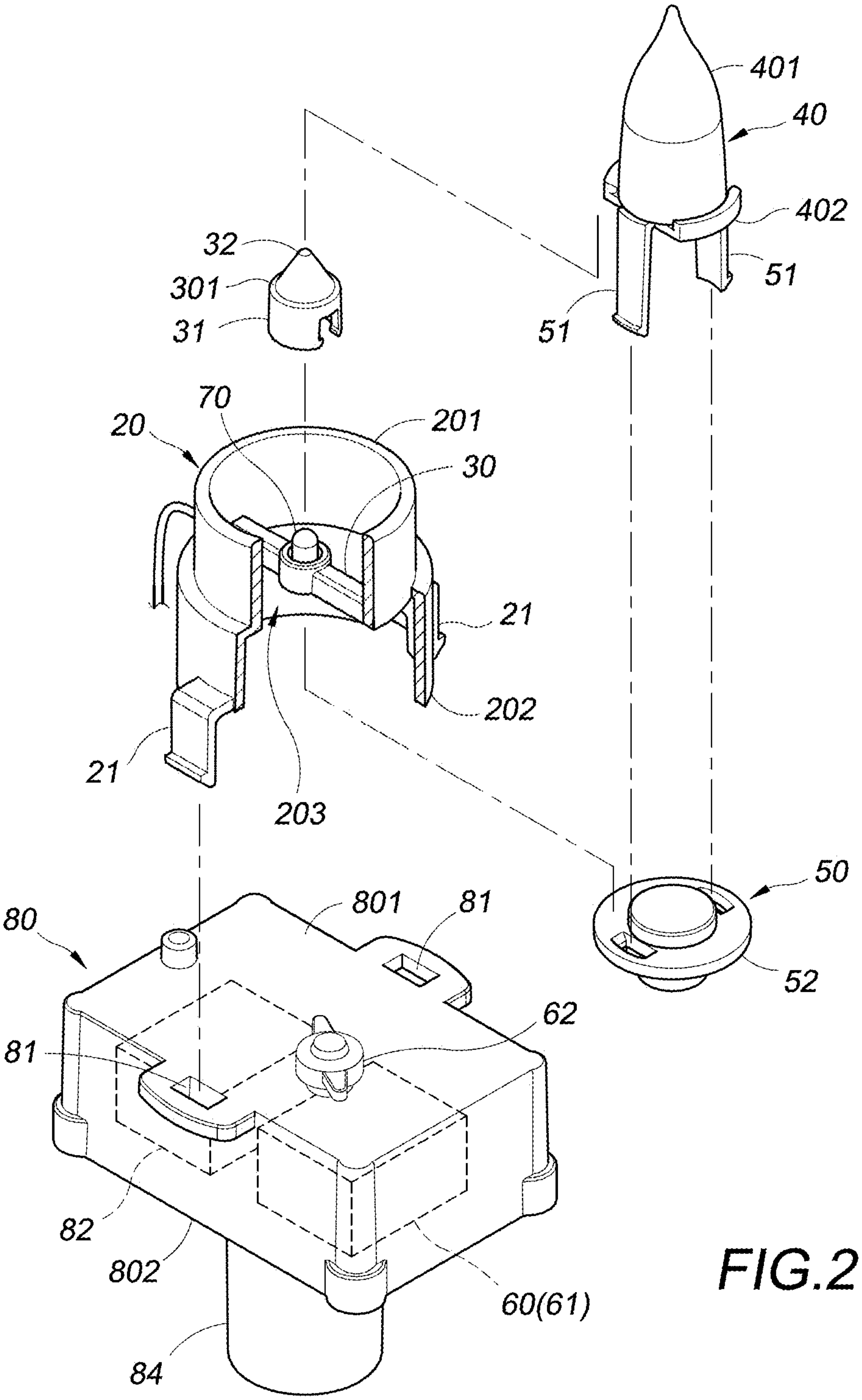
FIG. 2 is an exploded view of the present invention.

In an embodiment as shown in FIGS. 2 and 4, the bottom end 202 of the hollow lamp holder 20 is provided with an assembly box 80, a top surface 801 of the assembly box 80 has an appropriate distance from the counterweight 52 of the counterweight assembly 50 by, a motor 61 of the drive assembly 60 is disposed in the assembly box 80, and a pendulum member 62 of the drive assembly 60 is disposed on a top surface 801 of the assembly box 80.

In the embodiments of the assembly structure of the hollow lamp holder 20 and the assembly box 80 as disclosed in the figures, a hook set 21 extends downward from the bottom end 202 of the hollow lamp holder 20, and a snap slot set 81 extends outward from a corresponding position of the top surface 801 of the assembly box 80. The hook set 21 of the hollow lamp holder 20 can be fastened and fixed to the snap slot set 81 of the assembly box 80, so that the assembly relationship of the hollow lamp holder 20 and the assembly box 80 will not damage the shielding effect of the assembly box 80.

In an embodiment as shown in FIGS. 1 and 2, the assembly box 80 is further provided with a controller 82 for controlling the LED 70 and the drive assembly 60, and the LED 70, the motor 61 and the controller 82 are electrically connected to a power supply module 83. The power supply module 83 can be arranged at the bottom end 102 of the cylindrical lamp housing 10. The power supply module 83 includes a rechargeable battery or a disposable battery (not shown in the figure), and a USB connector (not shown in the figure) is installed in the cylindrical lamp housing 10 to charge the rechargeable battery.

It is noteworthy that after the counterweight 52 produces irregular swings and angle changes, different resistances can be generated to the pendulum member 62 to touch the counterweight 52 again. Therefore, when the present invention is implemented, the motor 61 as shown in FIG. 4 can be designed into a control mode in which the controller 82 changes the rotation direction of the motor 61 and the pendulum member 62 according to the resistance, so that the swing of the counterweight 52 and the light-transmitting cover 40 is more random, and a natural flickering effect similar to a real flame is generated.

Furthermore, as shown in FIG. 1, a combining part 84 is provided between the bottom surface 802 of the assembly box 80 and the bottom end 102 of the cylindrical lamp housing 10, and a support tube 85 is installed between the two combining parts 84 for adjusting the height of the assembly box 80 according to the cylindrical lamp housing 10 of different heights.

The above embodiments and drawings are only examples of preferred embodiments of the present invention, which are not intended to limit the scope of the present invention, numerous modifications and variations could be made thereto by those skilled in the art without departing from the scope and spirit of the invention as set forth in the claims, and any similarities with the purpose, structure, device, feature, etc. of the present invention shall fall within the patent scope of the present invention.

What is claimed is:

1. A candle wick swing structure of a candle lamp, comprising:

a hollow lamp holder, having a circular top end and a bottom end, and an accommodation space formed between the circular top end and the bottom end;

a positioning bracket, horizontally spanned in the accommodation space of the hollow lamp holder, the positioning bracket comprising an LED located under the center of the circular top end, and a conical light-transmitting member mounted onto the top of the LED, and the conical light-transmitting member having a tip located at the top thereof;

a light-transmitting cover, in a simulated candle frame shape, and having a conical top end and a circular bottom end, the conical top end protruding from the top of the circular top end of the hollow lamp holder, the inner periphery of the circular bottom end being provided with an upper concave part which is concave upward and corresponding to the tip of the conical light-transmitting member, and the upper concave part being movably placed on the tip of the conical light-transmitting member, so as to allow the light emitted by the LED to pass through the conical light-transmitting member and irradiate the surrounding of the light-transmitting cover;

a counterweight assembly, comprising at least one extension arm extending downward from a part of the circular bottom end of the light-transmitting cover, and a counterweight arranged on the extension arm, the counterweight being disposed under the LED, such that the center of gravity of the light-transmitting cover is situated under the LED through the extension arm and the counterweight; and a drive assembly, comprising a motor and a pendulum member driven to rotate by the motor, the pendulum member being located at a position where its rotation stroke is interfered by the counterweight, so that the candle flame-shaped light-transmitting cover can swing irregularly relative to the LED with the tip of the conical light-transmitting member as the fulcrum by the pendulum member touching the counterweight during rotation, so as to simulate the effect of the flickering of the candle flame.

2. The candle wick swing structure of a candle lamp according to claim 1, wherein the positioning bracket comprises a fixing slot for fixing the LED, and the conical light-transmitting member is fixed onto the positioning bracket and covers the fixing slot and the top of the LED.

3. The candle wick swing structure of a candle lamp according to claim 2, wherein the bottom end of the hollow lamp holder is provided with an assembly box, the assembly box has a top surface, an appropriate distance is defined between the top surface and the counterweight of the counterweight assembly, the motor of the drive assembly is installed in the assembly box, and the pendulum member of the drive assembly is arranged on the top surface of the assembly box.

4. The candle wick swing structure of a candle lamp according to claim 3, wherein the bottom end of the hollow lamp holder is provided with a hook set extending downward, a corresponding position of the top surface of the assembly box is provided with a snap slot set extending outward, the hook set of the hollow lamp holder is engaged and fixed to the snap slot set of the assembly box.

5. The candle wick swing structure of a candle lamp according to claim 4, wherein the assembly box further comprises a controller for controlling the LED and the drive assembly.

6. The candle wick swing structure of a candle lamp according to claim 5, wherein the candle lamp further comprises a cylindrical lamp housing, the cylindrical lamp housing has a top surface and a bottom end, the center of the top surface is provided with an opening, the circular top end of the hollow lamp holder is situated under the inner periphery of the opening, such that the conical top end of the light-transmitting cover protrudes from the top of the opening of the cylindrical lamp housing.

7. The candle wick swing structure of a candle lamp according to claim 6, wherein the LED, the motor and the controller are electrically coupled to a power supply module, and the power supply module is installed at the bottom end of the cylindrical lamp housing.

8. The candle wick swing structure of a candle lamp according to claim 6, wherein the assembly box has a bottom surface, a combining part is disposed between the bottom surface of the assembly box and the bottom end of the cylindrical lamp housing, and a support tube is installed between the two combining parts for adjusting the height of the assembly box.

* * * * *